United States Patent
Foitl et al.

[15] 3,687,940
[45] Aug. 29, 1972

[54] PROCESS FOR THE PRODUCTION OF 3-AMINO-AZACYCLOHEPTAN-2-ONE

[72] Inventors: Verena R. Foitl, 58 Nonnenweg, Basel; Walter Traber, 6 Kappeligasse, Riehen, both of Switzerland

[73] Assignee: Ciba-Geigy Corporation, Ardsley, N.Y.

[22] Filed: June 24, 1970

[21] Appl. No.: 49,559

[52] U.S. Cl. ..........................................260/239.3 R
[51] Int. Cl. ..............................................C07d 41/06
[58] Field of Search ..............................260/239.3 R

[56] References Cited

UNITED STATES PATENTS 3,048,580   8/1962   Ottenheym et al..260/239.3 R
3,052,670   9/1962   Ottenheym et al..260/239.3 R
3,557,093   1/1971   Foitl et al............260/239.3 R Primary Examiner—Henry R. Jiles
Assistant Examiner—Robert T. Bond
Attorney—Karl F. Jorda and Frederick H. Rabin

[57]         ABSTRACT

A process is given for the production of 3-amino-azacycloheptan-2-one which comprises reducing 1-formyl-3-nitroazacycloheptan-2-on with hydrogen under pressure in the presence of ammonia. It is thus possible to obtain 3-amino-azacycloheptan-2-one ($\alpha$-amino-$\epsilon$-caprolactam) by a technically simple process.

4 Claims, No Drawings

PROCESS FOR THE PRODUCTION OF 3-AMINO-AZACYCLOHEPTAN-2-ONE

The present invention concerns a new process for the production of 3-amino-azacycloheptan-2-one ($\alpha$-amino-$\epsilon$-capro-lactam).

There are a number of methods known for the production of 3-amino-azacycloheptan-2-one ($\alpha$-amino-$\epsilon$-caprolactam). The most simple process known previously was the reduction of 3-nitroazacycloheptan-2-one ($\alpha$-nitro-$\epsilon$-caprolactam) with hydrogen in the presence of a catalyst to the corresponding amine compound (cf. Swiss Pat. No. 375,720). The 3-nitro-azacycloheptan-2-one needed as starting material for this process was obtained from 2-chloro-azacyclo-2,3-heptene by a process which involved several steps and was thus complicated (cf. British Pat. Nos. 901,169; 867,268; and 867,269). Furthermore it is known that in certain $\alpha$-halogenocapronic acids the $\alpha$-halogen atom can be replaced by an amino group by reaction with ammonia. This reaction was applied to $\alpha$-halogen-$\epsilon$-caprolactam, the desired amino compound, as the hydrochloride, as well as other reaction products being obtained (cf. U.S. Pat. No. 2,876,218).

It has now been found that 3-amino-azacycloheptan-2-one is obtained in good purity and good yields by reducing 1-formyl-3-nitro-azacycloheptan-2-one with hydrogen under pressure at temperatures between 50° and 150°C in the presence of ammonia and a solvent. Suitable solvents which can be used are those which are inert towards the reaction components and in which the 3-amino-azacycloheptan-2-one to be produced is readily soluble. The ready-solubility of the reaction product in the solvent makes it easier to isolate. In particular, solvents which are miscible with water are used. In this way, the liquid phase remains homogeneous during the reduction. Preferred solvents are lower alkanols such as ethanol, methanol, isopropanol as well as mixtures of such alkanols with water.

The reduction of the nitro group can be performed with nascent hydrogen or also with molecular hydrogen. It is preferable to perform the reduction with molecular hydrogen in the presence of a catalyst, for example in the presence of Raney-nickel. Raney-cobalt, platinum, palladium and other suitable metals and metallic compounds.

In the process according to the invention, besides the reduction of the nitro group, the formyl group is split off. The formyl group is taken up by ammonia to form formamide or ammonium formiate. It is preferable to employ the ammonia as a gas, since formamide can be easily removed by destillation from the reaction mixture. When concentrated aqueous ammonia solution is used, the formiate is obtained which is difficult to separate. In order to prevent as much as possible the formation of ammonium formiate, it is advisable to perform the reaction in an absolute or practically absolute solvent.

In practice, the procedure is as follows: 1-formyl-3-nitro-azacycloheptan-2-one, ethanol and Raney-nickel are added to a stainless steel autoclave, and ammonia gas is introduced. Then hydrogen gas is introduced into the autoclave in such a manner that the pressure is at least 20 atmospheres. The pressure may vary greatly and may even be increased to 200 to 300 atmospheres. Correspondingly, the reaction temperatures are in a range of from 50–150°C. At temperatures higher than that, the reaction does not follow the desired course. In particular, a temperature range of 50–120°C is used, preferably in the vicinity of 100°C.

The 1-formyl-3-nitro-azacycloheptan-2 -one serving as starting material for the process according to the invention is obtained by reaction the oxime of azacycloheptan-2-one ($\epsilon$-caprolactam) with a formylating agent based on an N-disubstituted formamide and a halogenating agent and afterwards nitrating the complex compound obtained as intermediate. By this process which is a one-step process, the starting material is obtained in good yields of good purity.

The reduction process according to the invention has, compared with previously known processes, the great advantage of employing as starting material a compound which is easy to produce. Since the formyl group can be easily cleaved, the reduction (hydrogenation) and the cleavage can be performed in one operation. Accordingly it is now possible to obtain 3-amino-azacycloheptan-2-one ($\alpha$-amino-$\epsilon$-caprolactam) by technically simple reactions.

The following example illustrates the process according to the invention. The temperatures are given in degrees centigrade.

EXAMPLE 50 g of 1-formyl-3-nitro-azacycloheptan-2-one, dissolved in 500 ml of 98 percent ethanol, and 5 g of Raney-nickel are added to a stainless steel autoclave. 46 g of ammonia gas is introduced into this suspension at room temperature and then the pressure is raised with hydrogen to 20 atmospheres. The autoclave is then heated within 1½ hours to 100° and kept for 4 hours at this temperature. The autoclave is then cooled to room temperature and the catalyst is removed from the hydrogenation mixture by filtration. The ethanol is removed from the filtrate by distillation in vacuum. The residue is then fractionated, formamide distilling first at 45°–49°/0.04 Torr and then the 3-amino-azacycloheptan-2-one ($\alpha$-amino-$\epsilon$-caprolactam) at 108°–109°/0.04 Torr. The yield is 26 g, 80 percent of the theory.

When the Raney-nickel is replaced by palladium on charcoal as catalyst, 27 g of the desired amine are obtained.

Production of the starting material:

70 g of phosgene are introduced at 10° to 15°, to 51.2 g of dimethylformamide and 30 ml of chloroform. Then the mixture is treated dropwise at 10° to 20° with a solution of 33.9 g of cyclohexanone oxime in 120 ml of chloroform, kept for 12 hours at room temperature and then heated for 2 hours at 50° to 60°. The solvent is then removed by distillation in vacuum and the residue is added dropwise at 0° to 10°, to a nitrating mixture obtained from 60 ml of concentrated nitric acid and 300 ml of concentrated sulfuric acid. After completion of the addition, the nitrating mixture is poured immediately into ice water, precipitating the nitro compound. The precipitate is separated and washed neutral with water. The resulting 1-formyl-3-nitro-azacycloheptan-2-one, recrystallized from ethanol, has a melting point of 120°–122°. The yield is 28.5 g, 51.3 percent of the theory.

What we claim is:

1. A process for the production of 3-aminoazacycloheptan-2-one comprising reducing 1-formyl-3- nitroazacycloheptan-2-one with hydrogen at a pressure of from 20 to 200 atmospheres and at a temperature between 50° and 150°C in the presence of ammonia and an inert solvent miscible with water.

2. A process according to claim 1, in which the solvent is selected from the group consisting of methanol, ethanol, isopropanol and mixtures thereof.

3. A process according to claim 1, in which the reduction is performed in the presence of a catalyst selected from the group consisting of Raney nickel, palladium, Raney cobalt and platinum.

4. A process according to claim 1, in which the reduction is performed at a pressure of from 20 to 200 atmospheres.

* * * * *